United States Patent
Kajihara et al.

(10) Patent No.: US 10,578,133 B2
(45) Date of Patent: Mar. 3, 2020

(54) CLUTCH ACTUATOR

(71) Applicant: HONDA MOTOR CO., LTD., Tokyo (JP)

(72) Inventors: Eisuke Kajihara, Niiza (JP); Akira Tokito, Kawagoe (JP); Kosuke Tsunashima, Sayama (JP); Junya Ono, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 159 days.

(21) Appl. No.: 15/715,411

(22) Filed: Sep. 26, 2017

(65) Prior Publication Data

US 2018/0087543 A1   Mar. 29, 2018

(30) Foreign Application Priority Data

Sep. 29, 2016 (JP) ................................. 2016-192033

(51) Int. Cl.
   *F15B 7/00*    (2006.01)
   *F15B 13/04*   (2006.01)
   (Continued)

(52) U.S. Cl.
   CPC ............ *F15B 13/0416* (2013.01); *F15B 1/04* (2013.01); *F16D 25/12* (2013.01); *B60Y 2200/12* (2013.01); *F15B 7/005* (2013.01)

(58) Field of Classification Search
   CPC ........................................................ F15B 7/08
   See application file for complete search history.

(56) References Cited

U.S. PATENT DOCUMENTS 6,352,018 B1   3/2002 Krisher
6,595,338 B2 * 7/2003 Bansbach ........... F16D 25/0638
                                                        180/247
(Continued)

FOREIGN PATENT DOCUMENTS

CN   103105757       5/2013
DE   102012202162 A1 8/2012
(Continued)

OTHER PUBLICATIONS

German Office Action with English Translation dated Jun. 24, 2019, 12 pages.
(Continued)

*Primary Examiner* — F Daniel Lopez
(74) *Attorney, Agent, or Firm* — Rankin, Hill & Clark LLP

(57) ABSTRACT

This clutch actuator includes a hydraulic pressure generating mechanism (51) configured to operate a clutch (26) to provide a connected state or a disconnected state, a motor (52) configured to generate a rotary driving force for driving the hydraulic pressure generating mechanism (51) to a driving shaft (52*a*), a transmission mechanism (54) configured to transmit the rotary driving force generated in the driving shaft (52*a*) of the motor (52) to a driven member (54*b*) parallel to the driving shaft (52*a*) in an axial direction and disposed coaxially with a cylinder main body (51*a*), and a conversion mechanism (55) configured to convert the rotary driving force transmitted to the driven member (54*b*) into a reciprocal driving force of a piston (51*b*) in a stroke direction, wherein the hydraulic pressure generating mechanism (51), the motor (52), the transmission mechanism (54) and the conversion mechanism (55) are integrated as a unit.

6 Claims, 11 Drawing Sheets

(51) Int. Cl.
  *F15B 1/04* (2006.01)
  *F16D 25/12* (2006.01)

(56) References Cited

U.S. PATENT DOCUMENTS

| | | | |
|---|---|---|---|
| 7,097,019 B2 * | 8/2006 | Ronk | F16D 29/00 192/84.91 |
| 8,118,571 B2 * | 2/2012 | Krisher | F16D 29/005 417/318 |
| 2013/0118303 A1 | 5/2013 | Murakami et al. | |
| 2013/0333366 A1 | 12/2013 | Grethel et al. | |

FOREIGN PATENT DOCUMENTS

| | | |
|---|---|---|
| JP | 2007-155104 | 6/2007 |
| JP | 2011-075041 | 4/2011 |
| JP | 5991037 | 8/2016 |
| WO | 2015/090316 A1 | 6/2015 |

OTHER PUBLICATIONS

Japanese Office Action dated Dec. 3, 2019, English abstract included, 6 pages.
Indian Office Action dated Jan. 2, 2020, 5 pages.

\* cited by examiner

CLUTCH ACTUATOR

CROSS-REFERENCE TO RELATED APPLICATION

The present application claims priority based on Japanese Patent Application No. 2016-192033 filed on Sep. 29, 2016, the contents of which are incorporated herein by reference.

BACKGROUND OF THE INVENTION

Field of the Invention

The present invention relates to a clutch actuator.

Description of Related Art

In the related art, a clutch actuator in which a hydraulic cylinder configured to generate a hydraulic pressure and a motor serving as a drive source configured to drive the hydraulic cylinder are integrated is known. In Japanese Unexamined Patent Application, First Publication No. 2007-155104, a transmission mechanism using a cam is provided as a mechanism configured to transmit a driving force of a motor to a hydraulic cylinder. As a result, the motor and the hydraulic cylinder are laid out such that center shafts thereof cross each other.

SUMMARY OF THE INVENTION

Incidentally, while the clutch actuator disclosed in Japanese Unexamined Patent Application, First Publication No. 2007-155104 is used in an automatic clutch system, the clutch actuator is preferably easily mounted on a conventional manual clutch type vehicle, and further miniaturization is required.

Here, an aspect of the present invention is provided to achieve miniaturization of a clutch actuator.

In order to accomplish the above-mentioned object, a clutch actuator according to an aspect of the present invention employs the following configurations.

(1) An aspect of the present invention is a clutch actuator including a hydraulic pressure generating mechanism configured to operate a clutch to provide a connected state or a cut state by stroking a piston in a cylinder main body to generate a hydraulic pressure and supplying the hydraulic pressure toward the clutch; a motor disposed such that an axial direction of a driving shaft is parallel to an axial direction of the cylinder main body of the hydraulic pressure generating mechanism and configured to generate a rotary driving force for driving the hydraulic pressure generating mechanism to the driving shaft; a transmission mechanism configured to transmit the rotary driving force generated in the driving shaft of the motor to a driven member parallel to the driving shaft in the axial direction and disposed coaxially with the cylinder main body; and a conversion mechanism installed coaxially with the driven member between the driven member and the piston of the hydraulic pressure generating mechanism and configured to convert the rotary driving force transmitted to the driven member into a reciprocal driving force in a stroke direction of the piston, wherein the hydraulic pressure generating mechanism, the motor, the transmission mechanism and the conversion mechanism are integrated as a unit.

(2) In the aspect of (1), a valve mechanism configured to communicate with or block a main oil path continuous with a downstream side of the hydraulic pressure generating mechanism may be further provided, and the valve mechanism may extend along a central axis parallel to the axial direction of the motor.

(3) In the aspect of (1), a hydraulic pressure sensor configured to detect a hydraulic pressure of the main oil path continuous with a downstream side of the hydraulic pressure generating mechanism may be further provided, and the hydraulic pressure sensor may extend along a central axis parallel to the axial direction of the motor.

(4) In the aspect of (3), the hydraulic pressure sensor may be provided in plural, and the plurality of hydraulic pressure sensors may extend along a central axis parallel to the axial direction of the motor.

(5) In the aspect of (1), an accumulator mechanism connected to a main oil path continuous with a downstream side of the hydraulic pressure generating mechanism may be further provided, and the accumulator mechanism may extend along a central axis parallel to the axial direction of the motor.

(6) In the aspect of (1), an accumulator mechanism connected to a main oil path continuous with a downstream side of the hydraulic pressure generating mechanism may be further provided, and the accumulator mechanism may extend along a central axis perpendicular to the axial direction of the motor and may be disposed within an overall width of the clutch actuator in the axial direction of the accumulator mechanism.

(7) In the aspect of (6), a hydraulic pressure sensor configured to detect a hydraulic pressure of the main oil path may be further provided, and the hydraulic pressure sensor may be disposed to be arranged with the accumulator mechanism in the axial direction of the motor.

(8) In the aspect of (7), the hydraulic pressure sensor may be installed in plural, and an arrangement direction of the plurality of hydraulic pressure sensors may be along the axial direction of the accumulator mechanism.

According to the above-mentioned aspect of (1), since the axial direction of the cylinder of the hydraulic pressure generating mechanism, the axial direction of the driving shaft of the motor and the axial directions of the transmission mechanism and the conversion mechanism are disposed parallel to each other, in comparison with the case in which the axial directions of the hydraulic pressure generating mechanism, the motor, the transmission mechanism and the conversion mechanism are disposed to approximately cross each other, the hydraulic pressure generating mechanism and the motor, which are relatively large in particular, cannot easily protrude in the axial direction, and the hydraulic pressure generating mechanism and the motor can be disposed close to each other to reduce an interval therebetween. For this reason, it is possible to provide the clutch actuator that is configured as a compact unit.

According to the aspect of (2), even when the valve mechanism configured to open and close the oil path is provided, as the axial direction of the valve mechanism is disposed parallel to the axial direction of the motor, an increase in size can be suppressed even when the oil path forming section having a valve mechanism is provided as a unit.

According to the aspect of (3), when the hydraulic pressure sensor configured to detect a hydraulic pressure of the oil path is provided, as the extension direction of the hydraulic pressure sensor is disposed parallel to the axial direction of the motor, the hydraulic pressure sensor cannot easily protrude in the axial direction, and miniaturization of the unit can be achieved.

According to the aspect of (4), when the plurality of hydraulic pressure sensors are provided in the oil path, as the extension directions are disposed parallel to the axial direction of the motor, the hydraulic pressure sensors cannot easily protrude in the axial direction, parts in the unit can be collectively disposed, and further miniaturization of the unit can be achieved.

According to the aspect of (5), when the accumulator mechanism connected to the oil path is provided, as the extension direction of the accumulator mechanism is disposed parallel to the axial direction of the motor, the accumulator cannot easily protrude in the axial direction, parts in the unit can be collectively disposed, and further miniaturization of the unit can be achieved.

According to the aspect of (6), when the accumulator mechanism connected to the oil path is provided, even though the accumulator mechanism should be disposed to be perpendicular to the axial direction of the motor, as the accumulator mechanism is disposed within an overall width of the clutch actuator in the axial direction, protrusion of the accumulator mechanism in the axial direction can be suppressed, and miniaturization of the unit can be achieved.

According to the aspect of (7), when the hydraulic pressure sensor configured to detect a hydraulic pressure of the oil path is provided, protrusion of the hydraulic pressure sensor in the axial direction of the accumulator mechanism can be suppressed and miniaturization of the unit can be achieved while avoiding interference between the hydraulic pressure sensor and the accumulator mechanism.

According to the aspect of (8), when the plurality of hydraulic pressure sensors are provided in the oil path, as the hydraulic pressure sensors are disposed parallel to the axial direction of the accumulator, the hydraulic pressure sensors cannot easily protrude in the axial direction, parts in the unit can be collectively disposed, and further miniaturization of the unit can be achieved.

DESCRIPTION OF EMBODIMENTS

Figure 1:
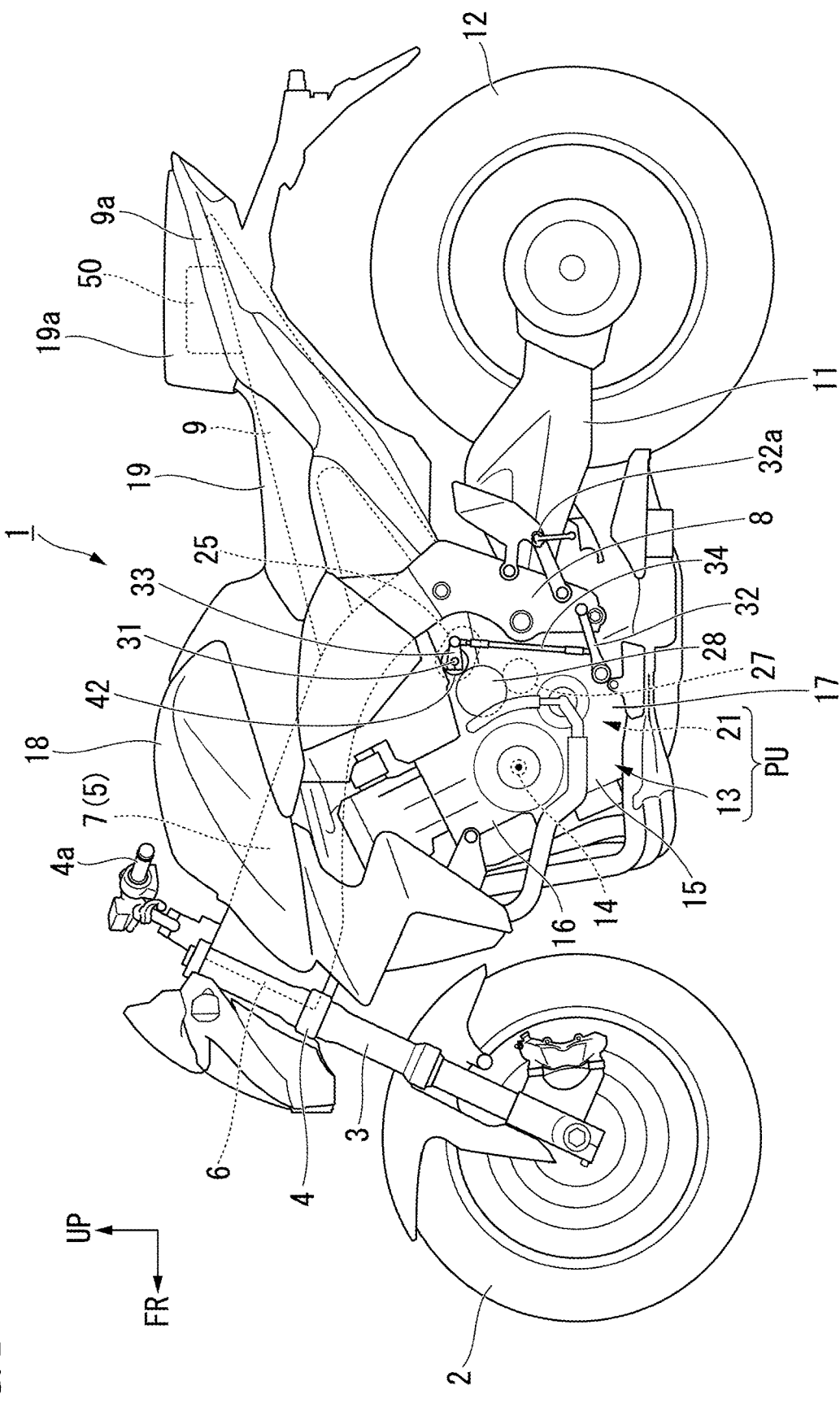
FIG. 1 is a left side view of a motorcycle according to an embodiment of the present invention.

Hereinafter, embodiments of the present invention will be described with reference to the accompanying drawings. Further, directions of forward, rearward, leftward, rightward, and so on, to be described below are the same as directions of a vehicle to be described below unless the context clearly indicates otherwise. In addition, in appropriate places in the drawings used in the following description, an arrow FR showing a forward direction with respect to a vehicle, an arrow LH showing a leftward direction with respect to the vehicle and an arrow UP showing an upward direction with respect to the vehicle are provided.

As shown in FIG. 1, an embodiment is applied to a motorcycle 1, which is a saddle riding vehicle. A front wheel 2 of the motorcycle 1 is supported by lower end portions of a pair of left and right front forks 3. Upper sections of the left and right front forks 3 are supported by a head pipe 6 of a front end portion of a vehicle body frame 5 via a steering stem 4. A bar type steering handle 4a is attached to a top bridge of the steering stem 4.

The vehicle body frame 5 includes the head pipe 6, main tubes 7 extending from the head pipe 6 toward a lower rear side at a center in vehicle width direction (a leftward/rightward direction), left and right pivot frames 8 continuous with lower sides of rear end portions of the main tubes 7, and a seat frame 9 continuous with rear sides of the main tubes 7 and the left and right pivot frames 8. Front end portions of swing arms 11 are swingably pivoted in the left and right pivot frames 8. A rear wheel 12 of the motorcycle 1 is supported by the rear end portions of the swing arms 11.

A fuel tank 18 is supported over the left and right main tubes 7. A front seat 19 and a rear seat cover 19a are supported over the seat frame 9 behind the fuel tank 18 to be arranged in a forward/rearward direction. Surroundings of the seat frame 9 are covered by a rear cowl 9a. A power unit PU serving as a prime mover of the motorcycle 1 is hung from lower sides of the left and right main tubes 7. The power unit PU is linked to the rear wheel 12 via, for example, a chain type transmission mechanism.

The power unit PU integrally has an engine 13 disposed at a front side thereof and a gearbox 21 disposed at a rear side thereof. The engine 13 is, for example, a multiple cylinder engine having a rotary shaft of a crankshaft 14 in a leftward/rightward direction (a vehicle width direction). The engine 13 has a cylinder 16 standing up above a front section of a crank case 15. A rear section of the crank case 15 is a gearbox case 17 configured to accommodate the gearbox 21.

Figure 2:
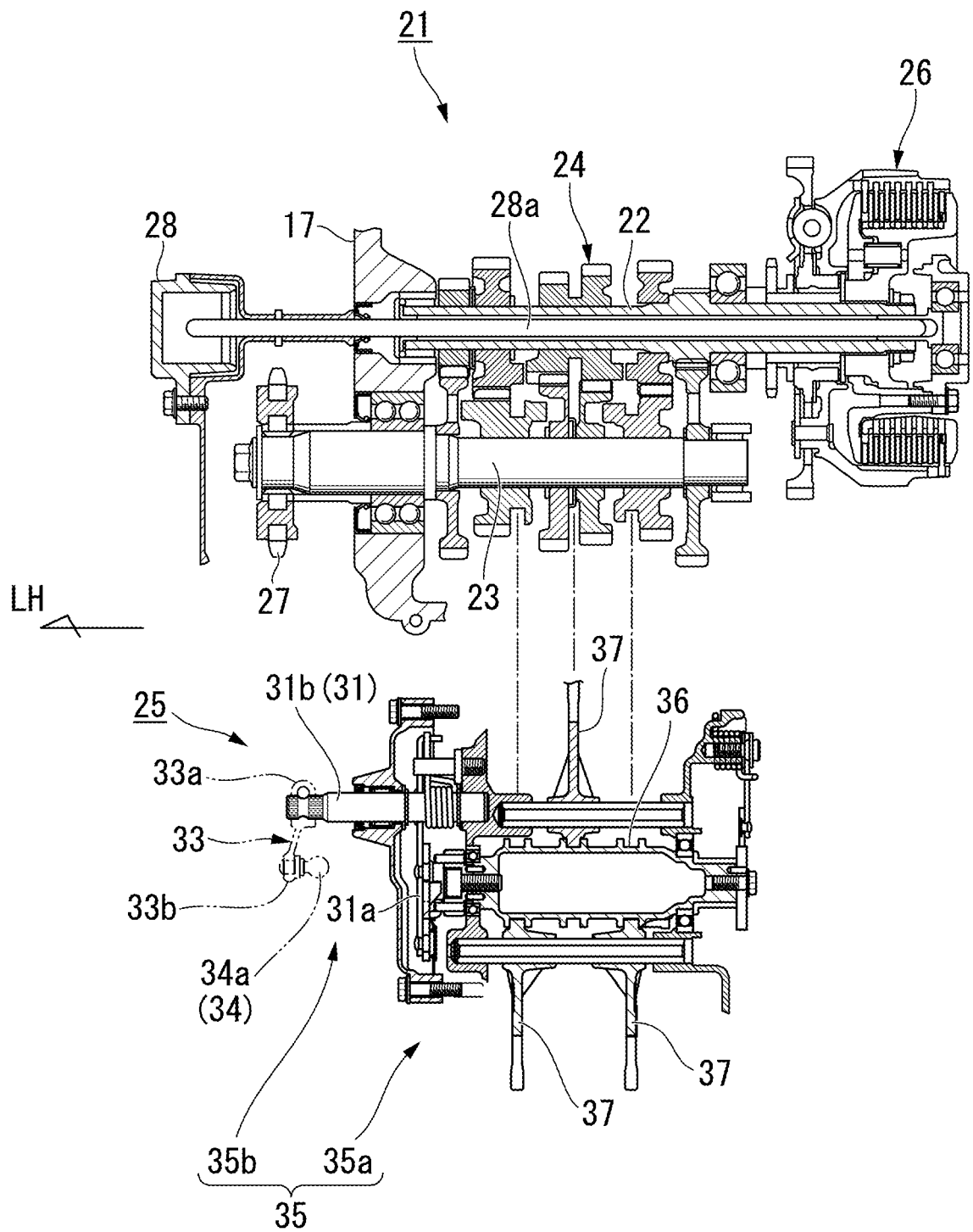
FIG. 2 is a cross-sectional view of a gearbox and a change mechanism of the motorcycle.

As shown in FIG. 2, the gearbox 21 is a stepped transmission having a main shaft 22 and a counter shaft 23, and a shifting gear group 24 that bridges both of the shafts 22 and 23. The counter shaft 23 constitutes an output shaft of the gearbox 21, and consequently, the power unit PU. An end portion of the counter shaft 23 protrudes toward a left side of a rear section of the crank case 15 and is connected to the rear wheel 12 via the chain type transmission mechanism.

Figure 3:
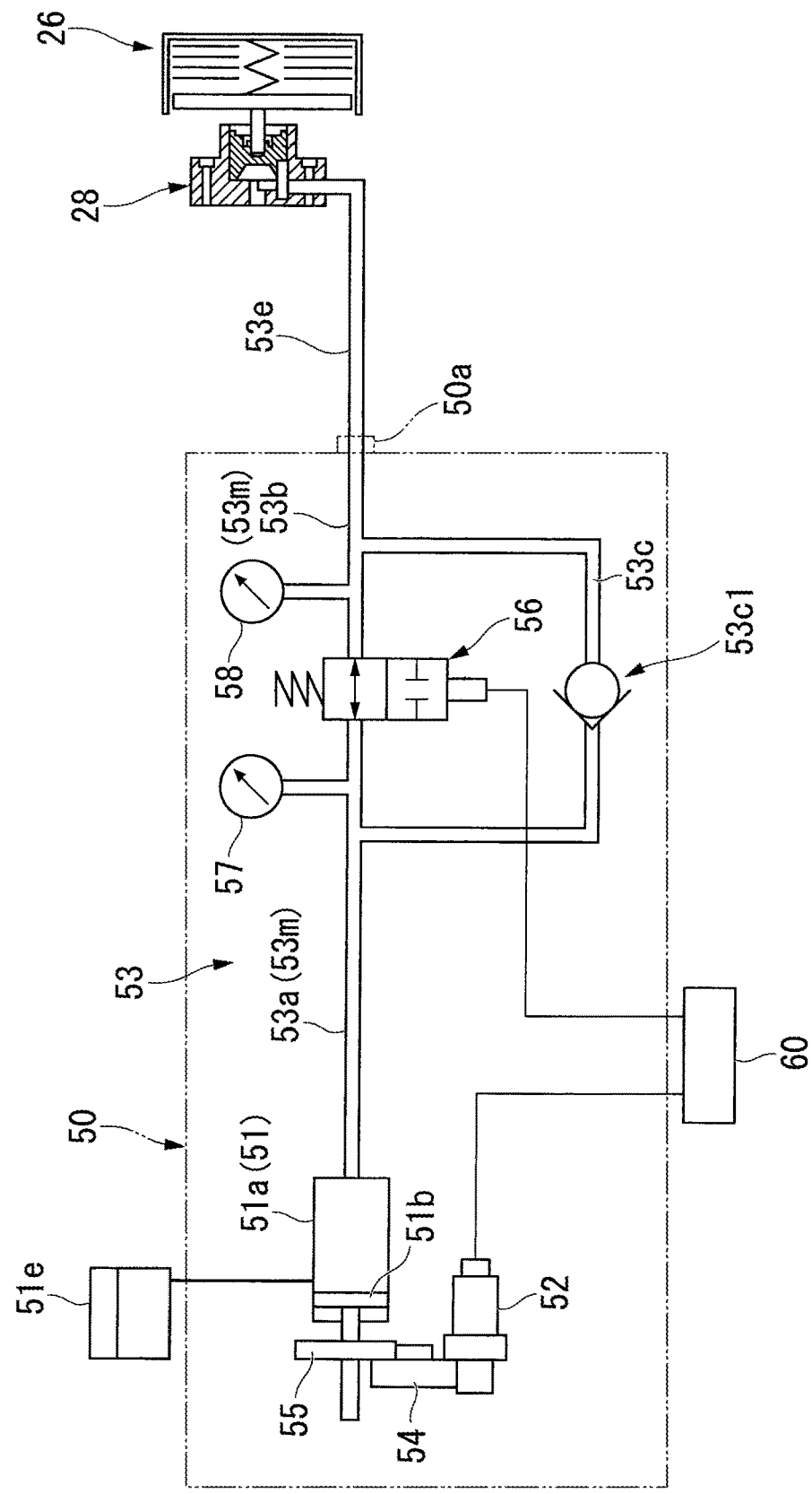
FIG. 3 is a view for schematically describing a clutch operation system including a clutch actuator.

Referring also to FIG. 3, the main shaft 22 and the counter shaft 23 of the gearbox 21 are disposed behind the crankshaft 14 to be arranged in the forward/rearward direction. A clutch 26 operated by a clutch actuator 50 is disposed coaxially with a right end portion of the main shaft 22. The clutch 26 is, for example, a multi-plate wet clutch, which is a so-called normal open clutch. That is, the clutch 26 is in a connected state in which power transmission is made possible by supply of a hydraulic pressure from the clutch actuator 50, and returns to a cut state in which power transmission is impossible when no hydraulic pressure from the clutch actuator 50 is supplied.

Referring to FIG. 2, rotary power of the crankshaft 14 is transmitted to the main shaft 22 via the clutch 26 and transmitted to the counter shaft 23 from the main shaft 22 via an arbitrary gear pair of the shifting gear group 24. A drive sprocket 27 of the chain type transmission mechanism is attached to a left end portion of the counter shaft 23 protruding toward a left side of a rear section of the crank case 15.

A change mechanism 25 configured to change a gear pair of the shifting gear group 24 is accommodated in the gearbox 21 on a rear upper side thereof. The change mechanism 25 operates a plurality of shift forks 37 according to a pattern of a lead groove formed on an outer circumference thereof due to rotation of a hollow cylindrical shift drum 36 parallel to both of the shafts 22 and 23, and changes a gear pair using power transmission between the shafts 22 and 23 in the shifting gear group 24.

The change mechanism 25 has a shift spindle 31 parallel to the shift drum 36. During pivotal movement of the shift spindle 31, a shift arm 31a fixed to the shift spindle 31 rotates the shift drum 36, moves the shift forks 37 in the axial direction according to a pattern of the lead groove, and changes a gear pair that enables power transmission in the shifting gear group 24 (i.e., changes a shifting stage).

The shift spindle 31 causes an outer shaft section 31b to protrude outward (toward a left side) from the crank case 15 in the vehicle width direction so that the change mechanism 25 can be operated. A shift load sensor 42 (a shift operation detection means) is attached coaxially to the outer shaft section 31b of the shift spindle 31 (see FIG. 1). A swing lever 33 is attached to the outer shaft section 31b of the shift spindle 31 (or a pivot shaft of the shift load sensor 42). The swing lever 33 extends rearward from a base end portion 33a fixed to the shift spindle 31 (or the pivot shaft) by a clamp, and an upper end portion of a link rod 34 is swingably connected to a tip portion 33b thereof via an upper ball joint 34a. A lower end portion of the link rod 34 is swingably connected to a shift pedal 32 operated by a driver's foot via a lower ball joint (not shown).

As shown in FIG. 1, a front end portion of the shift pedal 32 is vertically swingably supported by a lower section of the crank case 15 via a shaft in the leftward/rightward direction. A pedal section on which a driver's foot placed on a step 32a is put is formed on a rear end portion of the shift pedal 32, and a lower end portion of the link rod 34 is connected to an intermediate section of the shift pedal 32 in the forward/rearward direction.

As shown in FIG. 2, a shift change apparatus 35 including the shift pedal 32, the link rod 34 and the change mechanism 25 and configured to change a shifting stage gear of the gearbox 21 is provided. In the shift change apparatus 35, an assembly (the shift drum 36, the shift forks 37, and so on) configured to change a shifting stage of the gearbox 21 in the gearbox case 17 is referred to as a shift operation section 35a, and an assembly (the shift spindle 31, the shift arm 31a, and so on) configured to pivot the shift spindle 31 into which a shift operation to the shift pedal 32 is input around the axis thereof and transmit the pivotal movement to the shift operation section 35a is referred to as a shifting operation receiving section 35b.

Here, the motorcycle 1 employs a so-called semi-automatic gear shift system in which only a shifting operation of the gearbox 21 (a foot operation of the shift pedal 32) is performed by a driver, and a cutting and connecting operation of the clutch 26 is automatically performed by electric control according to an operation of the shift pedal 32.

Figure 4:
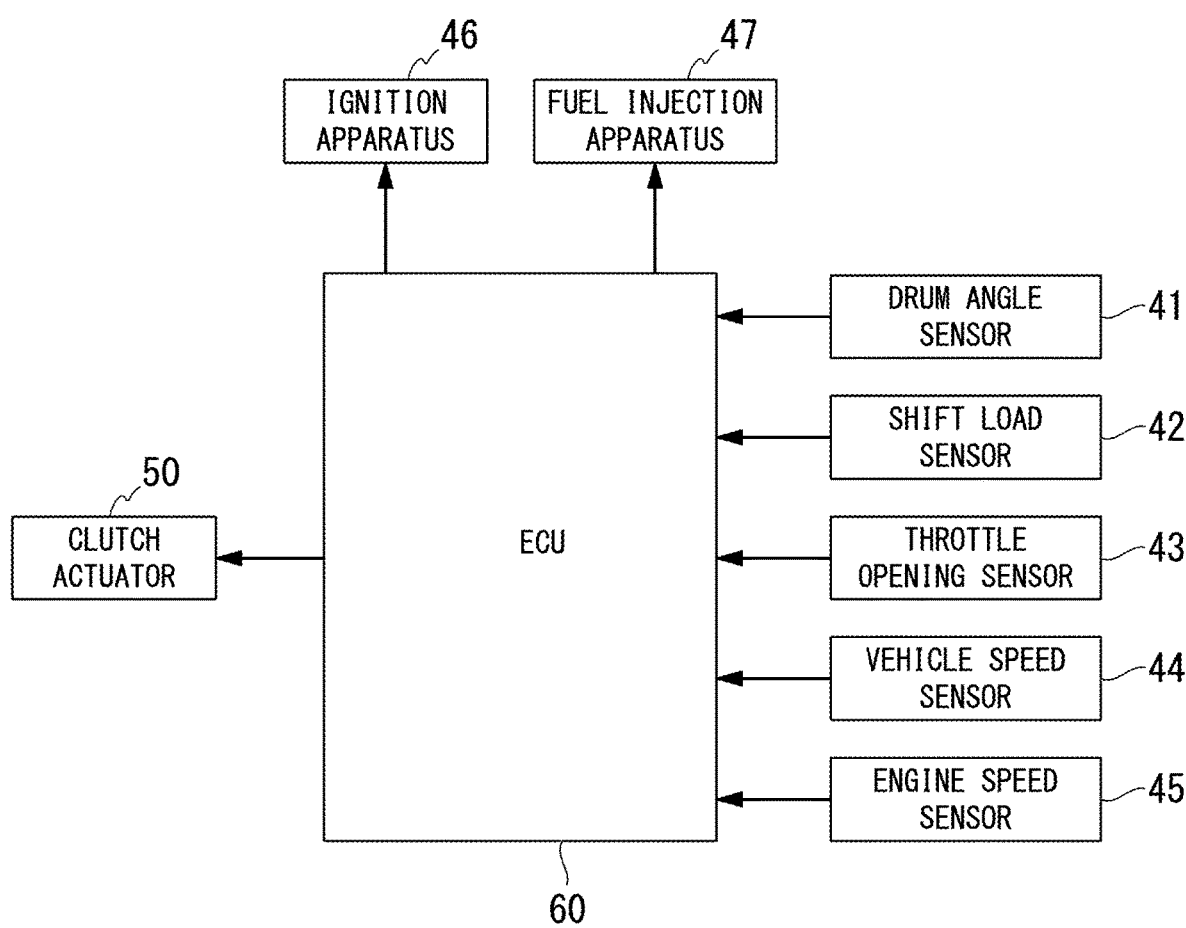
FIG. 4 is a block diagram of a gear shift system.

As shown in FIG. 4, the gear shift system includes the clutch actuator 50, an electronic control unit (ECU, a control unit) 60 and various sensors 41 to 45.

The ECU 60 controls operations of an ignition apparatus 46 and a fuel injection apparatus 47 while controlling an operation of the clutch actuator 50 on the basis of detection information from a drum angle sensor (a gear position sensor) 41 configured to detect a shifting unit from a pivot angle of the shift drum 36 and a shift load sensor (a torque sensor) 42 configured to detect an operating torque input into the shift spindle 31 and detection information of various vehicle states from a throttle opening sensor 43, a vehicle speed sensor 44, an engine speed sensor 45, and so on. Detection information from hydraulic pressure sensors 57 and 58 of the clutch actuator 50 is also input into the ECU 60.

Referring also to FIG. 3, the clutch actuator 50 can control a liquid pressure that cuts and connects the clutch 26 as the clutch actuator 50 is operated by the ECU 60. The clutch actuator 50 includes an electric motor 52 serving as a drive source (hereinafter, simply referred to as the motor 52), a master cylinder 51 (a hydraulic pressure generating mechanism) driven by the motor 52, and an oil path forming section 53 installed between the master cylinder 51 and a hydraulic pressure supply/discharge port 50a.

The master cylinder 51 strokes a piston 51b in a cylinder main body 51a by driving the motor 52, and can supply and discharge a working fluid in the cylinder main body 51a into/from a slave cylinder 28. Reference numeral 51e in the drawing designates a reservoir connected to the master cylinder 51.

The oil path forming section 53 has a valve mechanism (a solenoid valve 56) configured to open or block an intermediate area of a main oil path 53m from the master cylinder 51 toward the clutch 26 (the slave cylinder 28). The main oil path 53m of the oil path forming section 53 is divided into an upstream side oil path 53a closer to the master cylinder 51 than the solenoid valve 56 and a downstream side oil path 53b closer to the slave cylinder 28 than the solenoid valve 56. The oil path forming section 53 further includes a bypass oil path 53c that bypasses the solenoid valve 56 and brings the upstream side oil path 53a and the downstream side oil path 53b in communication with each other.

The solenoid valve 56 is a so-called normal open valve. A one-way valve 53c1 configured to cause a working fluid to flow in only one direction from an upstream side toward a downstream side is installed in the bypass oil path 53c. An upstream side hydraulic pressure sensor 57 configured to detect a hydraulic pressure of the upstream side oil path 53a is installed upstream from the solenoid valve 56. A downstream side hydraulic pressure sensor 58 configured to detect a hydraulic pressure of the downstream side oil path 53b is installed downstream from the solenoid valve 56.

As shown in FIG. 1, the clutch actuator 50 is accommodated in, for example, the rear cowl 9a. The slave cylinder 28 is attached to a rear section of the crank case 15 on the left side. The clutch actuator 50 and the slave cylinder 28 are connected to each other via a hydraulic pressure pipeline 53e (see FIG. 3).

As shown in FIG. 2, the slave cylinder 28 is disposed coaxially with the main shaft 22 on the left side. The slave cylinder 28 presses a push rod 28a passing through the main shaft 22 rightward when a hydraulic pressure from the clutch actuator 50 is supplied. The slave cylinder 28 actuates the clutch 26 to a connected state via the push rod 28a by pressing the push rod 28a rightward. The slave cylinder 28 releases the pressing against the push rod 28a and returns the clutch 26 to a disconnected state when no hydraulic pressure is supplied.

While a hydraulic pressure should be continuously supplied to maintain the clutch 26 in the connected state, electric power is consumed to that extent. Here, as shown in FIG. 3, the solenoid valve 56 is installed in the oil path forming section 53 of the clutch actuator 50, and the solenoid valve 56 is closed after supply of the hydraulic pressure toward the clutch 26. Accordingly, a configuration for maintaining the hydraulic pressure supplied toward the clutch 26 and supplementing a hydraulic pressure to an extent of a decrease in pressure (recharging the hydraulic pressure to an extent of leakage) is provided, and energy consumption is suppressed.

Figure 5:
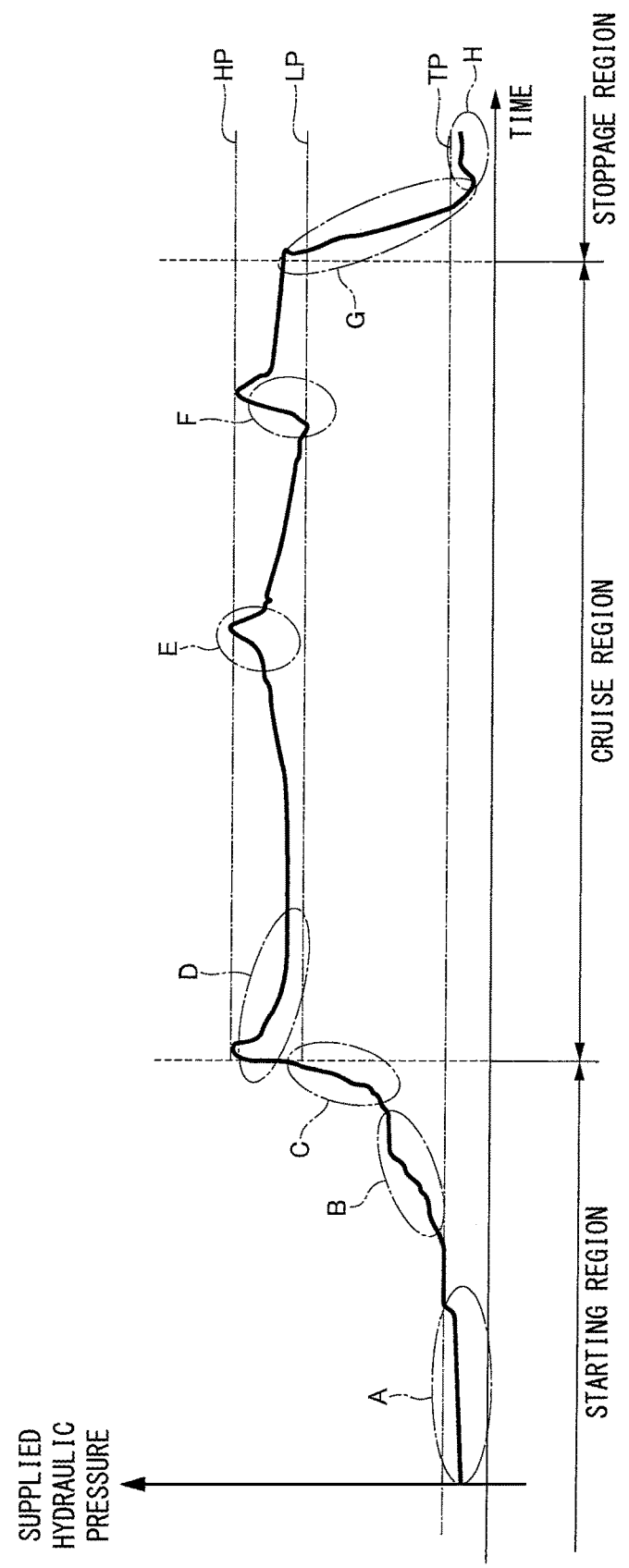
FIG. 5 is a graph showing a variation of a supplied hydraulic pressure in the clutch actuator.

Next, an action of the clutch control system will be described with reference to a graph of FIG. 5. In the graph of FIG. 5, a vertical axis represents a supplied hydraulic pressure detected by the downstream side hydraulic pressure sensor 58, and a horizontal axis represents the passage of time.

During stoppage (idling) of the motorcycle 1, the motor 52 and the solenoid valve 56 controlled by the ECU 60 are in a state in which supply of electric power is disconnected. That is, the motor 52 is in a stopped state and the solenoid valve 56 is in an open state. Here, the slave cylinder 28 side (a downstream side) is in a low pressure state with pressure lower than a touch point hydraulic pressure TP, and the clutch 26 is in a disengaged state (a disconnected state, a released state). The state corresponds to a region A of FIG. 5.

During starting of the motorcycle 1, when a rotation number of the engine 13 is increased, electric power is supplied to the motor 52 only, a hydraulic pressure is supplied from the master cylinder 51 to the slave cylinder 28 via the solenoid valve 56 in the open state. When the hydraulic pressure on the side of the slave cylinder 28 (a downstream side) is increased to be higher than the touch point hydraulic pressure TP, engagement of the clutch 26 is started, and the clutch 26 is in a half clutch state in which some power can be transmitted. Accordingly, smooth starting of the motorcycle 1 becomes possible. This state corresponds to a region B of FIG. 5.

Then, when a hydraulic pressure on the side of the slave cylinder 28 (the downstream side) reaches a lower limit holding hydraulic pressure LP, engagement of the clutch 26 is completed, and a driving force of the engine 13 is entirely transmitted to the gearbox 21. This state corresponds to a region C of FIG. 5. The regions A to C are set as a starting region.

Then, when the hydraulic pressure on the side of the slave cylinder 28 (the downstream side) reaches an upper limit holding hydraulic pressure HP, supply of electric power to the motor 52 is stopped and generation of a hydraulic pressure is stopped while electric power is supplied to the solenoid valve 56 and the solenoid valve 56 is closed. That is, while the upstream side is in a low pressure state as the hydraulic pressure is released, the downstream side is maintained in a high pressure state (the upper limit holding hydraulic pressure HP). Accordingly, the clutch 26 can be maintained in an engaged state without generation of a hydraulic pressure by the master cylinder 51, and electric power consumption can be suppressed while traveling of the motorcycle 1 is possible.

Even in a state in which the solenoid valve 56 is closed, due to hydraulic pressure leakage or a decrease in temperature caused by deformation of seals of the solenoid valve 56 and the one way valve 53c1, as shown in a region D of FIG. 5, a hydraulic pressure on the downstream side is gradually decreased (leaks). Meanwhile, as shown in a region E of FIG. 5, a hydraulic pressure on the downstream side may be increased due to an increase in temperature or the like. A slight variation in hydraulic pressure on the downstream side can be absorbed by an accumulator 59 (an accumulator mechanism), and thus electric power consumption due to operations of the motor 52 and the solenoid valve 56 does not increase with every variation in hydraulic pressure.

As shown in the region E of FIG. 5, when the hydraulic pressure on the downstream side is increased to the upper limit holding hydraulic pressure HP, the solenoid valve 56 is opened step by step, and the hydraulic pressure on the downstream side is relieved to the upstream side by decreasing supply of electric power to the solenoid valve 56.

As shown in a region F of FIG. 5, when the hydraulic pressure on the downstream side is decreased to the lower limit holding hydraulic pressure LP, supply of electric power to the motor 52 is started while the solenoid valve 56 is closed, and the hydraulic pressure on the upstream side is increased. When the hydraulic pressure on the upstream side is higher than the hydraulic pressure on the downstream side, the hydraulic pressure is supplemented (recharged) to the downstream side via the bypass oil path 53c and the one way valve 53c1. When the hydraulic pressure on the downstream side reaches the upper limit holding hydraulic pressure HP, supply of electric power to the motor 52 is stopped and generation of a hydraulic pressure is stopped. Accordingly, the hydraulic pressure on the downstream side is maintained between the upper limit holding hydraulic pressure HP and the lower limit holding hydraulic pressure LP, and the clutch 26 is maintained in an engaged state. The regions D to F are set as a cruise region.

During stoppage of the motorcycle 1, supply of electric power to the motor 52 and the solenoid valve 56 is also stopped. Accordingly, the master cylinder 51 stops generation of a hydraulic pressure and stops supply of a hydraulic pressure to the slave cylinder 28. The solenoid valve 56 is in an open state, and a hydraulic pressure in the downstream side oil path 53b is returned to the reservoir 51e. Accordingly, the slave cylinder 28 side (the downstream side) is in a low pressure state with pressure lower than the touch point hydraulic pressure TP, and the clutch 26 is in a disengaged state. This state corresponds to regions G and H of FIG. 5. The regions G and H are set as a stoppage region.

Figure 6:
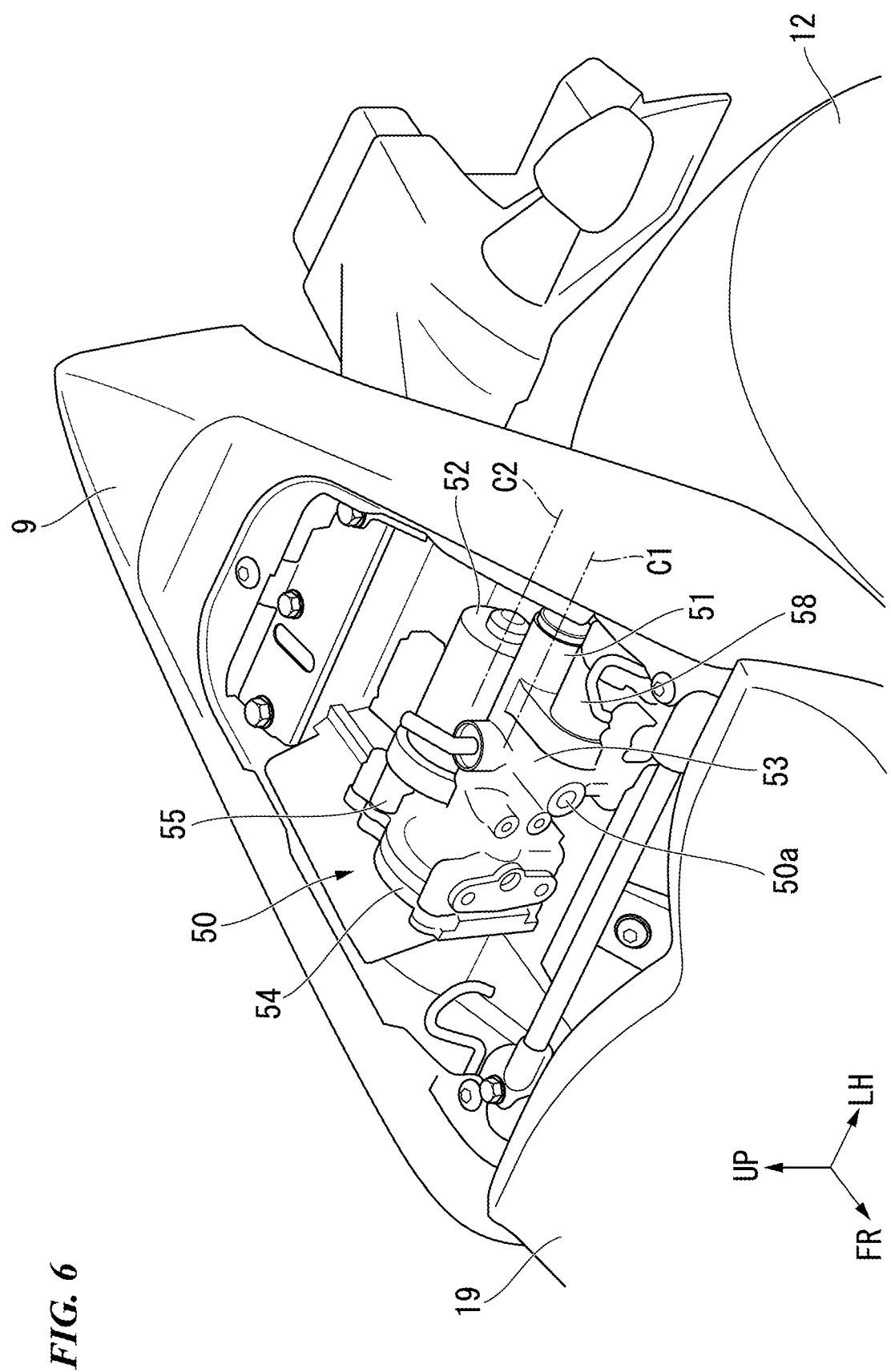
FIG. 6 is a perspective view showing a state in which a clutch actuator of a first embodiment is mounted in a vehicle.
Figure 7:
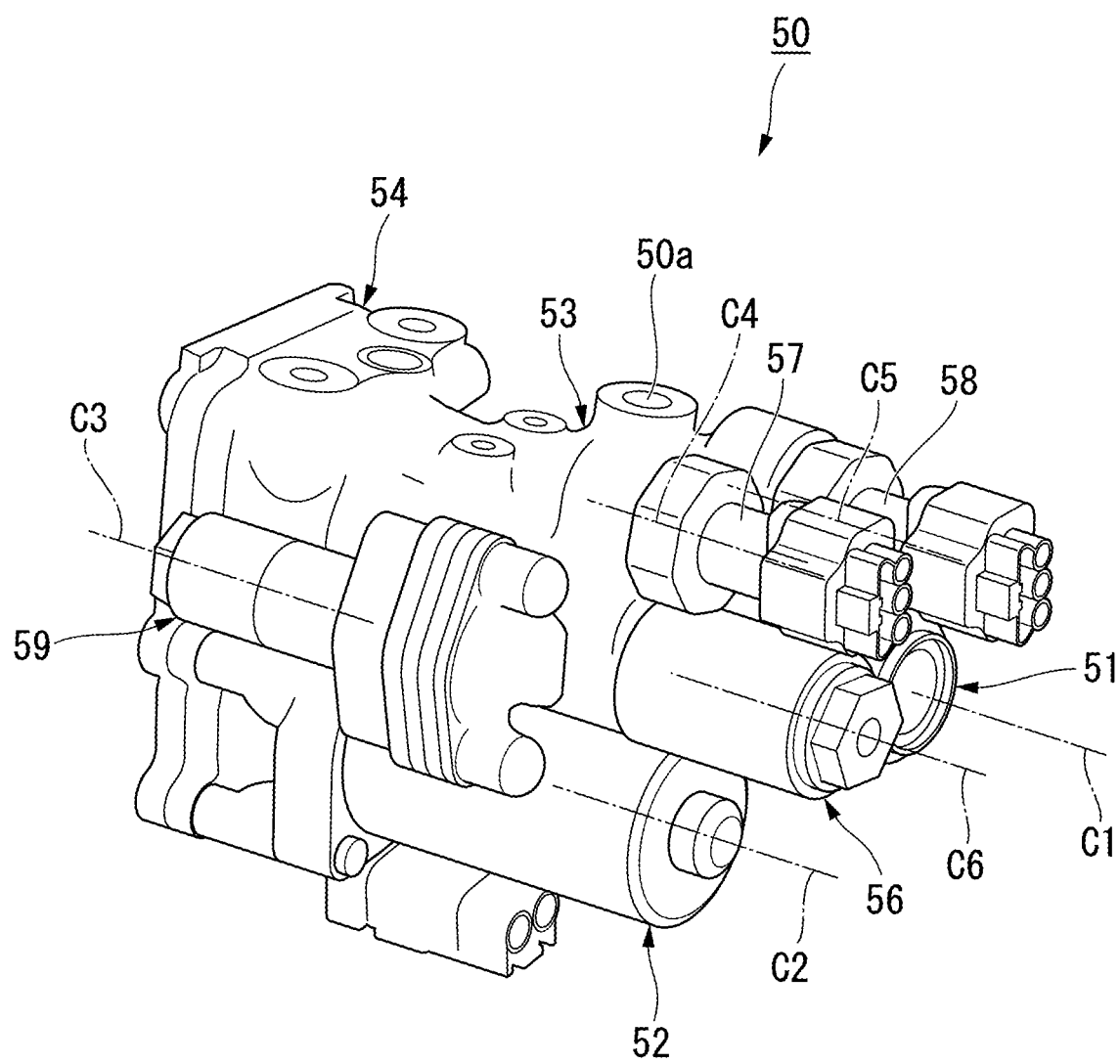
FIG. 7 is a perspective view of the clutch actuator of the first embodiment.
Figure 8:
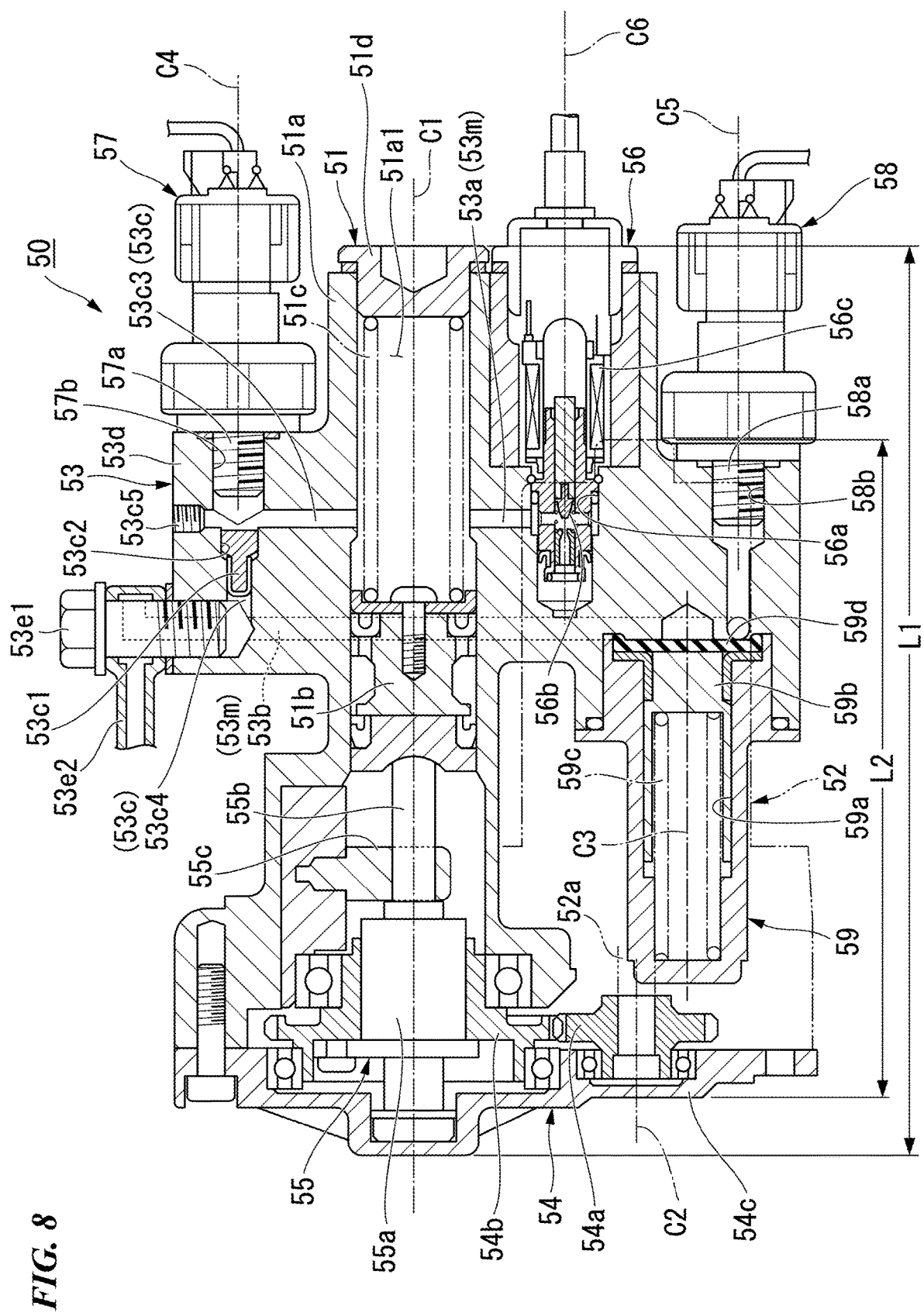
FIG. 8 is a cross-sectional view of the clutch actuator of the first embodiment.

As shown in FIG. 6 to FIG. 8, the clutch actuator 50 includes the master cylinder 51, the motor 52, a transmission mechanism 54, a conversion mechanism 55 and the oil path forming section 53, which are integrated as a unit. Further, in FIG. 6, the rear seat cover 19a is removed.

The clutch actuator 50 is disposed such that an axial direction of a driving shaft 52a of the motor 52 is parallel to an axial direction of the master cylinder 51 (an axial direction of the cylinder main body 51a, a stroke direction of the piston 51b). A line C1 in the drawings represents a central axis of the master cylinder 51 in the axial direction, and a line C2 represents a central axis of the motor 52 in the axial direction. The clutch actuator 50 is mounted in a vehicle such that the axial direction of the motor 52 and the master cylinder 51 is along a vehicle width direction (a leftward/rightward direction).

Referring to FIG. 8, an overall length L1 in a disposition area of the master cylinder 51 in the axial direction is larger than an overall length L2 of a disposition area of the motor 52 in the axial direction. The disposition area of the motor 52 is disposed within the overall length L1 of the disposition area of the master cylinder 51 in the axial direction.

The driving shaft 52a of the motor 52 protrudes toward a left side of a main body including a stator and a rotor in the drawing. The conversion mechanism 55 serving as a ball screw mechanism is disposed coaxially with and adjacent to the master cylinder 51 on the left side of the drawing. The transmission mechanism 54 is installed to bridge the driving shaft 52a of the motor 52 and the conversion mechanism 55.

The transmission mechanism 54 includes a drive gear 54a having a relatively small diameter and coaxially attached to the driving shaft 52a of the motor 52, a driven gear 54b (a driven member) having a relatively large diameter and attached to a ball nut 55a of the conversion mechanism 55, and a cover member 54c that bridges the master cylinder 51 and an end portion of the motor 52 on the left side of the drawing. A gear case configured to rotatably accommodate both of the gears 54a and 54b is formed by end portions of the master cylinder 51 and the motor 52, and the cover member 54c.

The conversion mechanism 55 has the ball nut 55a having a cylindrical shape coaxial with the master cylinder 51, and a ball screw shaft 55b coaxially inserted through the ball nut 55a. The driven gear 54b is integrally rotatably attached to the ball nut 55a. The ball screw shaft 55b extends from the ball nut 55a toward a right side of the drawing, is supported in a state in which rotation thereof is restricted by a guide member 55c, and causes a tip portion thereof to abut a facing end portion of the piston 51b of the master cylinder 51.

The piston 51b of the master cylinder 51 is biased toward a left side of the drawing by a coil spring 51c in the cylinder main body 51a. While an end portion of the cylinder main body 51a on the right side of the drawing is open, the opening section is closed by screwing of an end cap 51d. The end cap 51d functions as a spring seat for a right end of the coil spring 51c. The end cap 51d is screwed and fixed to the opening section of the cylinder main body 51a after inserting the piston 51b and the coil spring 51c into the cylinder main body 51a from the opening section of the cylinder main body 51a. The end cap 51d closes the opening section of the cylinder main body 51a while compressing the coil spring 51c to apply an initial load.

Movement of the piston 51b in the cylinder main body 51a toward the left side of the drawing is restricted by the piston 51b abutting the ball screw shaft 55b. A space in the cylinder main body 51a on the right side of the piston 51b in the drawing is a hydraulic pressure chamber 51a1 in which a hydraulic pressure supplied to the slave cylinder 28 is generated. Further, miniaturization of the piston 51b can be achieved while a spring length is secured by forming a right side of the piston 51b in the drawing in a concave shape and causing the coil spring 51c to enter and be encapsulated therein.

When the motor 52 is driven, a rotary driving force is transmitted to the ball nut 55a via the transmission mechanism 54. The ball nut 55a converts the transmitted rotary driving force into a reciprocal driving force of the ball screw shaft 55b in the axial direction. The ball screw shaft 55b strokes toward the right side of the drawing during driving of the motor 52 and presses the piston 51b to supply a hydraulic pressure of the hydraulic pressure chamber 51a1 to the slave cylinder 28. The ball screw shaft 55b can stroke toward the left side of the drawing together with the piston 51b due to the biasing force of the coil spring 51c during stoppage of the motor 52, and can collect the hydraulic pressure supplied to the slave cylinder 28.

The oil path forming section 53 integrally forms an oil path forming block 53d at an outer circumference of the master cylinder 51.

The oil path forming block 53d has the upstream side oil path 53a extending from the hydraulic pressure chamber 51a1 of the master cylinder 51 toward one side of the outside in the radial direction (a lower side of the drawing), the downstream side oil path 53b extending in parallel to the upstream side oil path 53a, for example, on the side closer to the transmission mechanism 54 than the upstream side oil path 53a, and the bypass oil path 53c configured to bring an area of the downstream side oil path 53b on the side of the hydraulic pressure supply/discharge port 50a and the hydraulic pressure chamber 51a1 of the master cylinder 51 in communication with each other.

The solenoid valve 56 is disposed in the master cylinder 51 on a lower side of the drawing. The solenoid valve 56 includes a spool 56b that can stroke in a cylinder hole 56a punched in the oil path forming block 53d, and a solenoid 56c fixed on the side of the cylinder hole 56a and excited by supply of electric power to stroke the spool 56b.

When the spool 56b is at a non-operation position at which the spool 56b strokes to a right side of the drawing due to a biasing force of the return spring, the solenoid valve 56 is in an open state, and the upstream side oil path 53a and the downstream side oil path 53b are in a communication state. When the spool 56b is at an operation position at which the spool 56b strokes to a left side in the drawing due to an electromagnetic force of the solenoid 56c, the solenoid valve 56 is in a closed state, and the upstream side oil path 53a and the downstream side oil path 53b are in a blocked state.

The solenoid valve 56 is disposed such that a stroke direction (an axial direction) of the spool 56b is parallel to the axial direction of the master cylinder 51 and the motor 52. A line C6 in the drawing represents a central axis of the solenoid valve 56 in the axial direction.

The upstream side hydraulic pressure sensor 57 and the downstream side hydraulic pressure sensor 58 are attached to the oil path forming block 53d on the right side of the drawing. The hydraulic pressure sensors 57 and 58 are formed in rod shapes extending parallel to the axial directions of the master cylinder 51 and the motor 52, and hydraulic pressure sensing units 57a and 58a are screwed and attached to attachment holes 57b and 58b punched in the oil path forming block 53d. The sensing unit 57a of the upstream side hydraulic pressure sensor 57 faces an upstream bypass oil path 53c3 (to be described below) of the bypass oil path 53c, and the sensing unit 58a of the downstream side hydraulic pressure sensor 58 faces the downstream side oil path 53b. Further, the sensing unit 57a of the upstream side hydraulic pressure sensor 57 may face the upstream side oil path 53a.

The hydraulic pressure sensors 57 and 58 are disposed such that extension directions (axial directions) thereof are parallel to the axial directions of the master cylinder 51 and the motor 52. Lines C4 and C5 in the drawing represent central axes in the axial directions of the hydraulic pressure sensors 57 and 58.

The accumulator 59 is attached to the oil path forming block 53d on the left side of the drawing. The accumulator 59 includes a piston 59b slidably fitted into an accumulator chamber 59a, a coil spring 59c configured to bias the piston 59b from the accumulator chamber 59a in a pressing-out direction, and a diaphragm 59d configured to separate the accumulator chamber 59a and the downstream side oil path 53b. The diaphragm 59d faces the downstream side oil path 53b. In the accumulator 59, when a hydraulic pressure of the downstream side oil path 53b is increased, the piston 59b is pressed against a biasing force of the coil spring 59c via the diaphragm 59d, and the hydraulic pressure is accumulated in the accumulator chamber 59a. After that, when the hydraulic pressure in the downstream side oil path 53b is decreased, the accumulated hydraulic pressure is discharged and a variation in pressure in the downstream side oil path 53b is suppressed.

The accumulator chamber 59a is formed integrally in a bottomed cylindrical shape, and reduction in size, weight and cost is achieved in comparison with a configuration in which a bottom section is formed by attaching a separate spring set bolt thereto.

The accumulator 59 is disposed such that a stroke direction (an axial direction) of the piston 59b is parallel to the axial directions of the master cylinder 51 and the motor 52. A line C3 in the drawing represents a central axis of the accumulator 59 in the axial direction.

An area of the bypass oil path 53c closer to the hydraulic pressure chamber 51a1 than the one way valve 53c1 (an area in communication with the hydraulic pressure chamber 51a1, hereinafter referred to as the upstream bypass oil path 53c3) is linearly arranged with the upstream side oil path 53a with the master cylinder 51 sandwiched therebetween. The upstream side oil path 53a and the upstream bypass oil path 53c3 have, for example, the same diameter, and may be formed by punching from one direction. Reference numeral 53c5 represents a seal plug configured to close an opening section of the upstream bypass oil path 53c3 outside the block.

An area of the bypass oil path 53c including a valve chamber 53c2 that accommodates the one way valve 53c1 (an area closer to the hydraulic pressure supply/discharge port 50a than the upstream bypass oil path 53c3, hereinafter referred to as a downstream bypass oil path 53c4) is formed to be perpendicular to the upstream bypass oil path 53c3. The downstream bypass oil path 53c4 is formed coaxially with an attachment hole 57b in an extension direction of the upstream side hydraulic pressure sensor 57. The attachment hole 57b is formed to have a diameter larger than that of the downstream bypass oil path 53c4 and that increases stepwise from the downstream bypass oil path 53c4 to the attachment hole 57b. For this reason, the downstream bypass oil path 53c4 and the attachment hole 57b may be formed by punching stepwise from one direction. An opening section of the attachment hole 57b outside the oil path forming block 53d is closed by attaching the upstream side hydraulic pressure sensor 57 thereto, and can allow elimination of the seal plug that closes the upstream bypass oil path 53c3 (the valve chamber 53c2).

The downstream side oil path 53b is punched from an upper end to a lower end of the oil path forming block 53d in the drawing. The upper end of the downstream side oil path 53b in the drawing is the hydraulic pressure supply/discharge port 50a into which a banjo bolt 53e1 is screwed coaxially. A banjo joint 53e2 of an end portion of the hydraulic pressure pipeline 53e is attached to the hydraulic pressure supply/discharge port 50a via the banjo bolt 53e1. An opening section of an upper end of the downstream side oil path 53b in the drawing is closed by attaching the hydraulic pressure pipeline 53e thereto and can allow elimination of the seal plug that closes the downstream side oil path 53b.

As described above, the clutch actuator 50 according to the embodiment includes the master cylinder 51 configured to operate the clutch 26 to provide a connected state by stroking the piston 51b in the cylinder main body 51a to generate a hydraulic pressure and supplying the hydraulic pressure to the slave cylinder 28 on the side of the clutch 26, the motor 52 disposed such that the axial direction of the driving shaft 52a is parallel to the axial direction of the cylinder main body 51a of the master cylinder 51 and configured to generate a rotary driving force for driving the master cylinder 51 to the driving shaft 52a, the transmission mechanism 54 configured to transmit a rotary driving force generated in the driving shaft 52a of the motor 52 to the driven gear 54b parallel to the driving shaft 52a in the axial direction and disposed coaxially with the cylinder main body 51a, and the conversion mechanism 55 installed coaxially with the piston 51b of the master cylinder 51 and configured to convert the rotary driving force transmitted to the driven gear 54b into a reciprocal driving force of the piston 51b in the stroke direction, wherein the master cylinder 51, the motor 52, the transmission mechanism 54 and the conversion mechanism 55 are integrated as a unit.

According to the configuration, since the axial direction of the cylinder main body 51a of the master cylinder 51, the axial direction of the driving shaft 52a of the motor 52 and the axial directions of the transmission mechanism 54 and the conversion mechanism 55 are disposed parallel to each other, in comparison with the case in which the axial directions of the master cylinder 51, the motor 52, the transmission mechanism 54 and the conversion mechanism 55 are disposed to approximately cross each other, the master cylinder 51 and the motor 52, which are relatively large in particular, cannot easily protrude in the axial direction, and the master cylinder 51 and the motor 52 can be disposed close to each other to reduce an interval therebetween. For this reason, the master cylinder 51 and the motor 52 can constitute the clutch actuator 50, which is provided as a compact unit.

In addition, the clutch actuator 50 includes the solenoid valve 56 configured to communicate with or block the main oil path 53m continuous with the master cylinder 51 on the downstream side, and the solenoid valve 56 extends along a central axis C6 parallel to the axial direction of the motor 52.

According to this configuration, even when the solenoid valve 56 configured to open and close the main oil path 53m is provided, as the axial direction of the solenoid valve 56 is disposed parallel to the axial direction of the motor 52, an increase in size can be suppressed even though the unit is provided to include the oil path forming section 53 having the solenoid valve 56.

In addition, the clutch actuator 50 includes the hydraulic pressure sensors 57 and 58 configured to detect a hydraulic pressure of the main oil path 53m, and the hydraulic pressure sensors 57 and 58 extend along the central axes C4 and C5 parallel to the axial direction of the motor 52.

According to this configuration, when the hydraulic pressure sensors 57 and 58 configured to detect a hydraulic pressure of the main oil path 53m are provided, as extension directions of the hydraulic pressure sensors 57 and 58 are disposed parallel to the axial direction of the motor 52, the hydraulic pressure sensors 57 and 58 cannot easily protrude in the axial direction, and miniaturization of the unit can be achieved.

In addition, the clutch actuator 50 extends along the central axes C4 and C5 of the plurality of hydraulic pressure sensors 57 and 58 parallel to the axial direction of the motor 52.

According to this configuration, when the plurality of hydraulic pressure sensors 57 and 58 are provided in the main oil path 53m, as the extension directions are disposed parallel to the axial direction of the motor 52, the hydraulic pressure sensors 57 and 58 cannot easily protrude in the axial direction, parts in the unit can be collectively disposed, and further miniaturization of the unit can be achieved.

In addition, the clutch actuator 50 includes the accumulator 59 connected to the main oil path 53m, and the accumulator 59 extends along a central axis C3 parallel to the axial direction of the motor 52.

According to this configuration, when the accumulator 59 connected to the main oil path 53m is provided, as the extension direction of the accumulator 59 is disposed parallel to the axial direction of the motor 52, the accumulator 59 cannot easily protrude in the axial direction, parts in the unit can be collectively disposed, and further miniaturization of the unit can be achieved.

<Second Embodiment>

Figure 9:
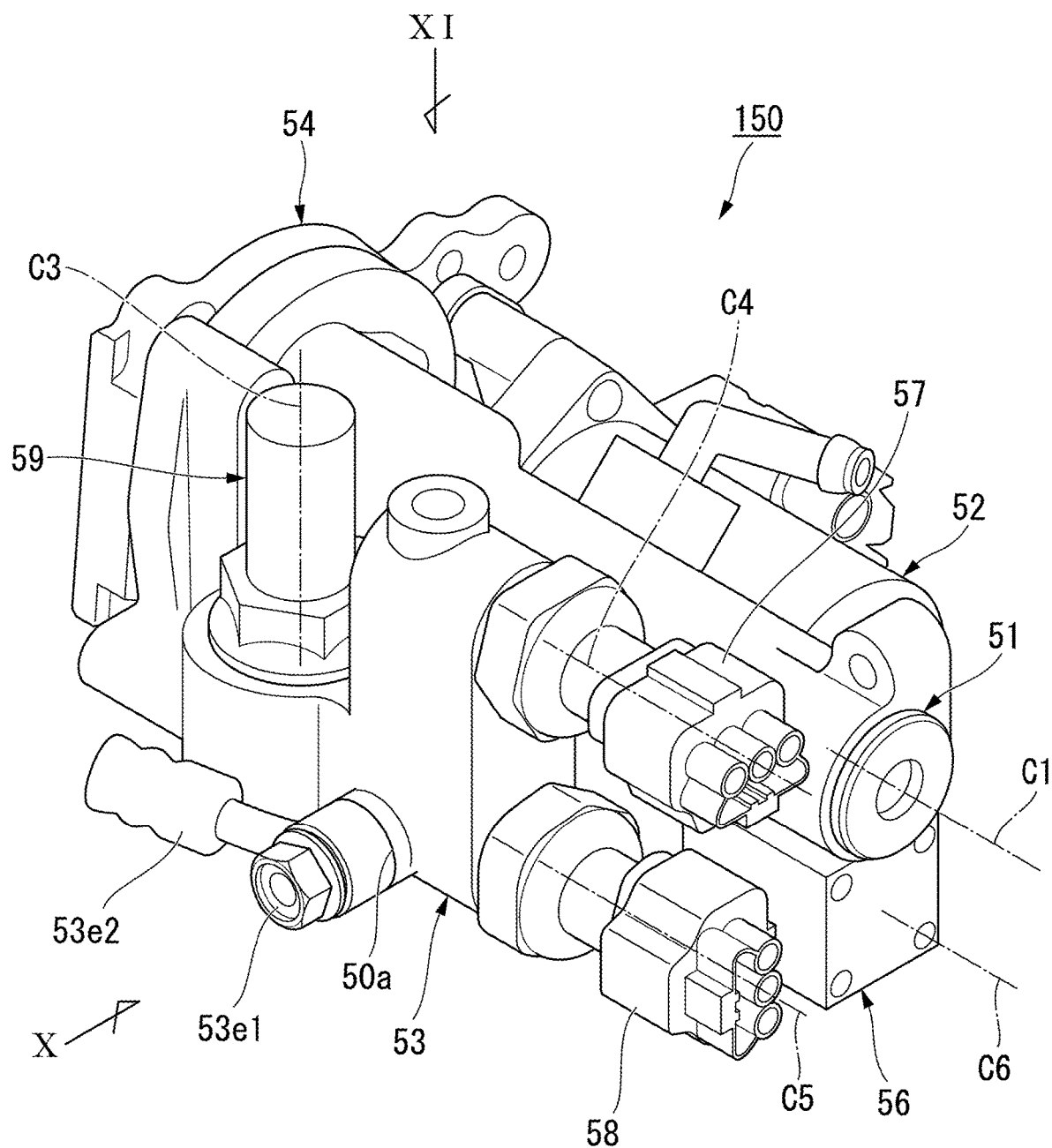
FIG. 9 is a perspective view of a clutch actuator of a second embodiment.
Figure 10:
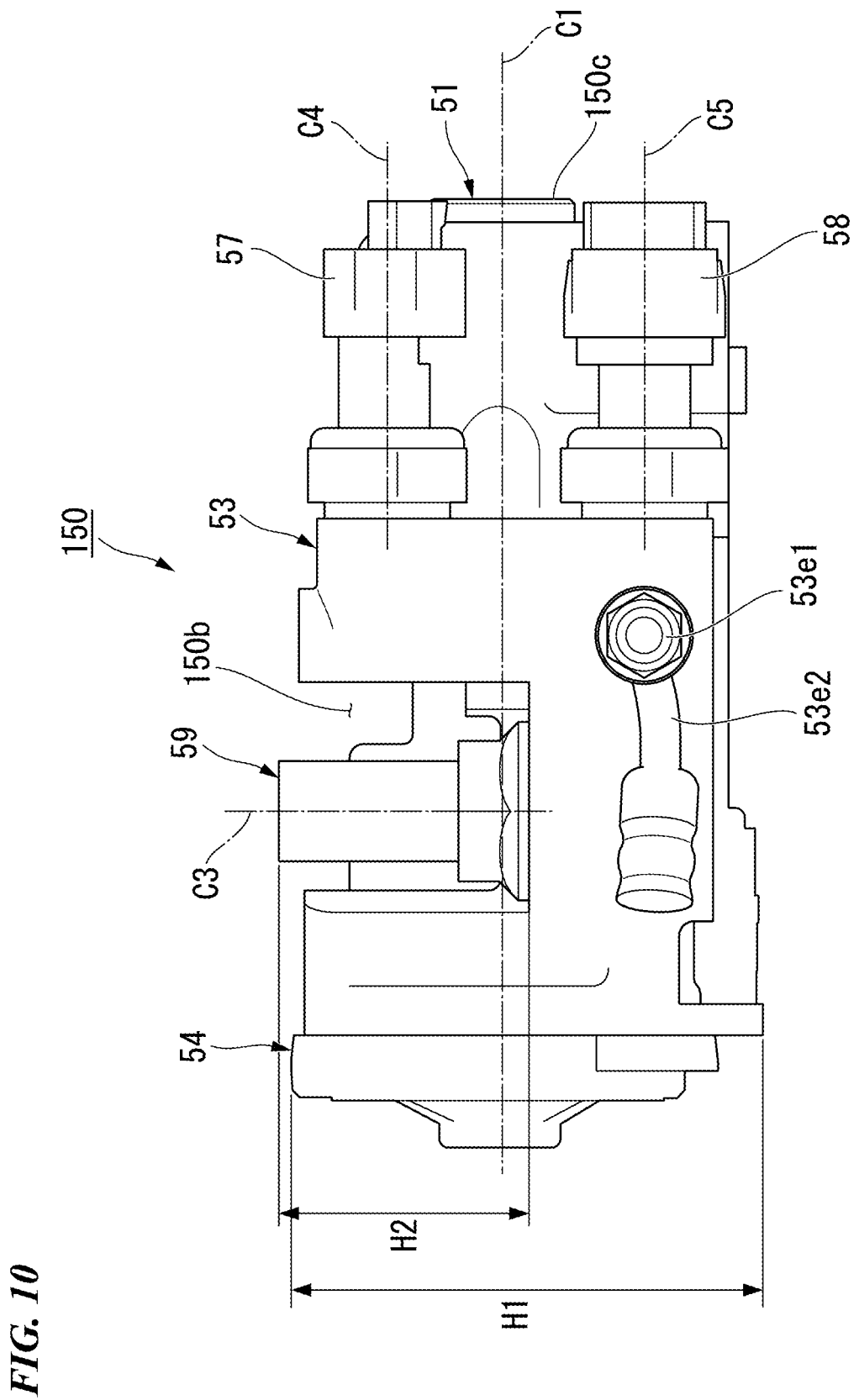
FIG. 10 is a view from an arrow X of FIG. 9.
Figure 11:
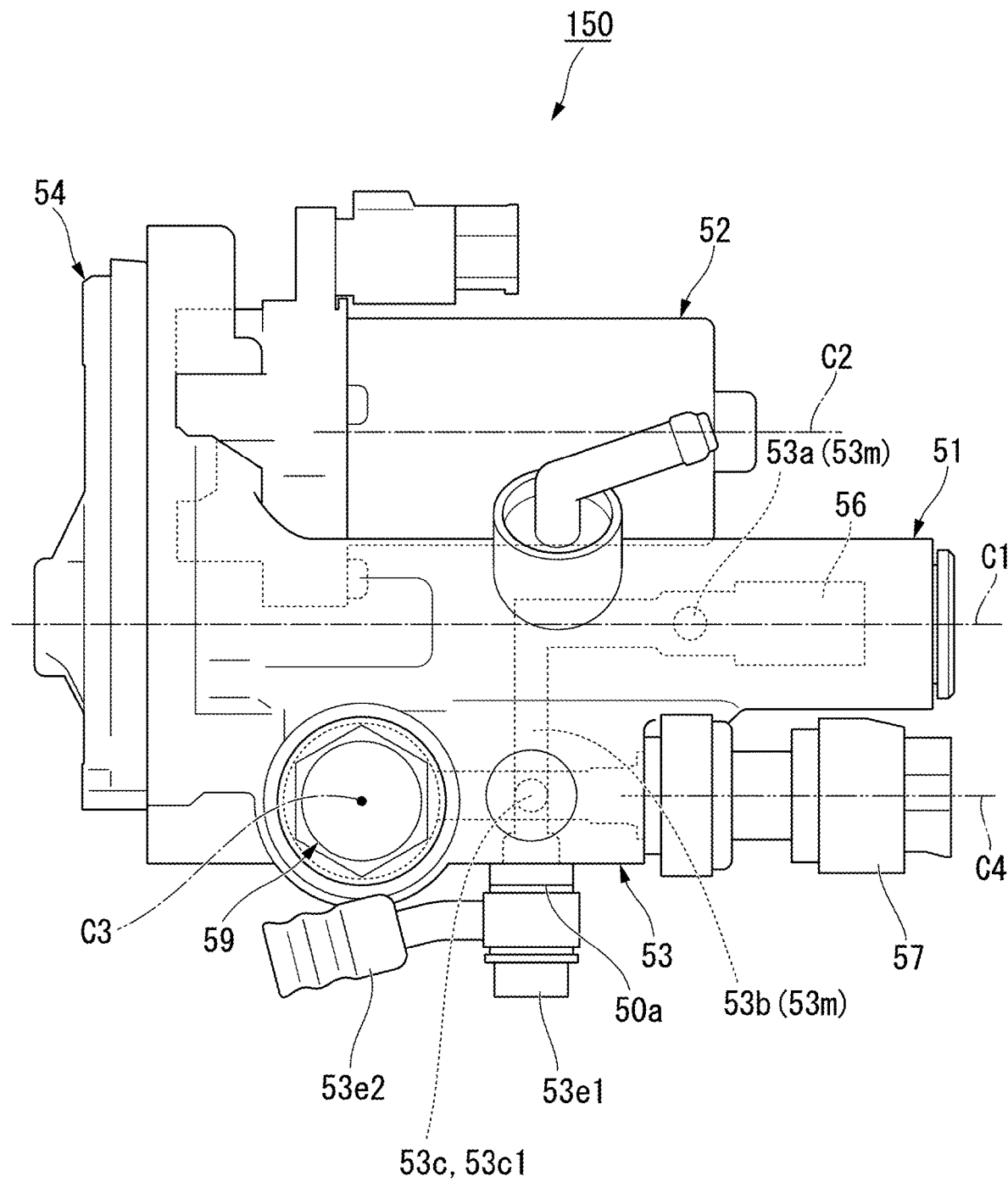
FIG. 11 is a view from an arrow XI of FIG. 9.

Next, a second embodiment of the present invention will be described with reference to FIG. 9 to FIG. 11.

The second embodiment is distinguished from the first embodiment in that disposition of the accumulator 59 differs. In addition, the same components as in the first embodiment are designated by the same reference numerals and detailed description thereof will be omitted.

In a clutch actuator 150 of the second embodiment, the accumulator 59 extends along the central axis C3 perpendicular to the axial direction of the motor 52 and is schematically disposed within an overall width H1 of the clutch actuator 150 in the axial direction of the accumulator 59. At least a half or more of an overall width H2 of the accumulator 59 in the axial direction is disposed within the overall width H1 of the clutch actuator 150. The overall width H2 of the accumulator 59 in the axial direction is smaller than the overall width H1 of the clutch actuator 150. The accumulator 59 is disposed to be sandwiched between the oil path forming section 53 and the transmission mechanism 54 in the axial direction of the motor 52. A concave section 150b configured to cause the accumulator 59 to sink inside the clutch actuator 150 is formed between the oil path forming section 53 and the transmission mechanism 54. Of course, the entire accumulator 59 may be disposed within the overall width H1 of the clutch actuator 150.

According to this configuration, even when the accumulator 59 should be arranged to be perpendicular to the axial direction of the motor 52 due to restriction or the like of a disposition space of the clutch actuator 150, as the accumulator 59 is disposed within the overall width H1 of the clutch actuator 150 in the axial direction, protrusion of the accumulator 59 in the axial direction can be suppressed, and miniaturization of the unit can be achieved.

In addition, in the clutch actuator 150, the hydraulic pressure sensors 57 and 58 extend along the central axes C4 and C5 parallel to the axial direction of the motor 52 (perpendicular to the axial direction of the accumulator 59). The hydraulic pressure sensors 57 and 58 are disposed to be arranged with the accumulator 59 in the axial direction of the motor 52.

According to this configuration, protrusion of the hydraulic pressure sensors 57 and 58 in the axial direction of the accumulator 59 can be suppressed and miniaturization of the unit can be achieved while avoiding interference of the accumulator 59 with the hydraulic pressure sensors 57 and 58.

Moreover, since the arrangement direction of the plurality of hydraulic pressure sensors 57 and 58 is along the axial direction of the accumulator 59, the plurality of hydraulic pressure sensors 57 and 58 and the accumulator 59 can be disposed on a plane, protrusion of the hydraulic pressure sensors 57 and 58 and the accumulator 59 can be suppressed, and further miniaturization of the unit can be achieved. The hydraulic pressure sensors 57 and 58 are disposed within the overall width H1 of the clutch actuator 150 in the axial direction of the accumulator 59. The hydraulic pressure sensors 57 and 58 are disposed not to protrude from an outer end 150c of the clutch actuator 150 in the axial direction of the motor 52.

Further, the present invention is not limited to the embodiments, and for example, the downstream side hydraulic pressure sensor 58 may be separately installed on the slave cylinder 28 or the like. Similarly, the accumulator 59 may be provided separately. In addition, the ECU 60 may be installed integrally. The present invention may be assembled with the clutch that enters a disconnected state due to supply of a hydraulic pressure from the master cylinder 51.

The present invention is not limited to a motorcycle and may be applied to a three-wheeled vehicle (including a two-front-wheeled and one-rear-wheeled vehicle in addition to a one-front-wheeled and two-rear-wheeled vehicle) or a four-wheeled vehicle.

The configuration of the embodiment is an example of the present invention. Various changes can be made to the embodiment, for example, the configuration elements in the embodiment are replaced with well-known configuration elements, insofar as the changes do not depart from the concept of the present invention.

What is claimed is:

1. A clutch actuator comprising:
a hydraulic pressure generating mechanism configured to operate a clutch to provide a connected state or a cut state by stroking a piston in a cylinder main body to generate a hydraulic pressure and supplying the hydraulic pressure toward a slave cylinder actuating the clutch;
a motor disposed such that an axial direction of a driving shaft is parallel to an axial direction of the cylinder main body of the hydraulic pressure generating mechanism and configured to generate a rotary driving force for driving the hydraulic pressure generating mechanism to the driving shaft;
a transmission mechanism configured to transmit the rotary driving force generated in the driving shaft of the motor to a driven member parallel to the driving shaft in the axial direction of the cylinder main body and disposed coaxially with the cylinder main body; and
a conversion mechanism installed coaxially with the piston and configured to convert the rotary driving force transmitted to the driven member into a reciprocal driving force in a stroke direction of the piston; and
an accumulator mechanism connected to a main oil path continuous with a downstream side of the hydraulic pressure generating mechanism,
wherein the accumulator mechanism extends along a central axis parallel to the axial direction of the driving shaft.

2. The clutch actuator according to claim 1, further comprising a valve mechanism configured to open or block an intermediate area of the main oil path continuous with the downstream side of the hydraulic pressure generating mechanism,
wherein the valve mechanism extends along the central axis parallel to the axial direction of the drive shaft.

3. The clutch actuator according to claim 1, further comprising a hydraulic pressure sensor configured to detect a hydraulic pressure of the main oil path continuous with the downstream side of the hydraulic pressure generating mechanism,
wherein the hydraulic pressure sensor extends along the central axis parallel to the axial direction of the drive shaft.

4. The clutch actuator according to claim 3, wherein the hydraulic pressure sensor is provided in plural.

5. The clutch actuator according to claim 1, further comprising a hydraulic pressure sensor configured to detect a hydraulic pressure of the main oil path.

6. The clutch actuator according to claim 5, wherein the hydraulic pressure sensor is installed in plural.

* * * * *